(12) United States Patent
Yeh et al.

(10) Patent No.: US 7,375,776 B2
(45) Date of Patent: May 20, 2008

(54) COLOR FILTER AND IN PLANE SWITCHING TYPE LIQUID CRYSTAL DISPLAY USING THE SAME

(75) Inventors: Sheng-Shiou Yeh, Miao-Li (TW); Mei Ling Wu, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 270 days.

(21) Appl. No.: 11/026,630

(22) Filed: Dec. 30, 2004

(65) Prior Publication Data

US 2005/0146669 A1 Jul. 7, 2005

(30) Foreign Application Priority Data

Jan. 2, 2004 (TW) .............................. 93100048 A

(51) Int. Cl.
*G02F 1/1339* (2006.01)
*G02F 1/1335* (2006.01)
*G02F 1/1337* (2006.01)

(52) U.S. Cl. ........................ 349/106; 349/156; 349/122
(58) Field of Classification Search ................ 349/156, 349/106, 122, 110
See application file for complete search history.

(56) References Cited

U.S. PATENT DOCUMENTS 6,304,308 B1 * 10/2001 Saito et al. .................. 349/155
2002/0067450 A1 * 6/2002 Moriya ........................ 349/129

* cited by examiner

*Primary Examiner*—David Nelms
*Assistant Examiner*—David Chung
(74) *Attorney, Agent, or Firm*—Wei Te Chung

(57) ABSTRACT

A color filter includes a substrate, a black matrix located on the substrate, a color layer formed on the substrate, and an over coat layer formed on the substrate to cover the black matrix and the color layer. A plurality of photo spacers are located corresponding to the black matrix, and engage with the over coat layer tightly. Therefore, an IPS LCD using the above-mentioned color filter has a steady configuration, and a cell gap of the LCD is consistent.

4 Claims, 4 Drawing Sheets

COLOR FILTER AND IN PLANE SWITCHING TYPE LIQUID CRYSTAL DISPLAY USING THE SAME

BACKROUND OF THE INVENTION

1. Field of the Invention

The present invention relates to a liquid crystal display, and more particularly to an IPS-LCD (in-plane switching liquid crystal display) having photo spacers.

2. Description of Prior Art

In a conventional liquid crystal display, a pair of facing transparent electrodes are respectively formed on two substrates, and are used for driving a liquid crystal layer therebetween. In such a device, a displaying means known as a TN (twisted nematic) display is adopted. That is, the liquid crystal display operates by being supplied with an electric field having a direction orthogonal to inner surfaces of the substrates.

However, the TN mode LCD has a narrow viewing angle. When the user views the display from beyond a threshold viewing angle, he/she cannot see the normal display. That is, the quality of the display greatly depends on the direction of viewing. In order to obtain a wide viewing angle, the IPS type LCD has been developed.

A detailed explanation about the configuration of a typical IPS-LCD device is provided hereinbelow, with reference to FIG. 7.

FIG. 7 is a schematic, side cross-sectional view of part of a conventional IPS-LCD. The IPS-LCD 100 comprises a color filter substrate 14 and a TFT substrate 17 spaced apart from each other, a liquid crystal layer 15 including liquid crystal molecules (not labeled) sandwiched between the substrates 14, 17, and a plurality of photo spacers 18 disposed between the substrates 14, 17 for supporting the IPS-LCD 100 and maintaining the space between the substrates 14, 17. A plurality of pixel electrodes 162 and a plurality of common electrodes 161 are formed on the lower substrate 17, for generating an electric field to drive the liquid crystal molecules.

A structure of a color filter of the IPS-LCD 100 includes the substrate 14, a black matrix 13 having a plurality of holes (not shown), a color layer 12, and an over coat layer 11 covering the black matrix 13 and the color layer 12. The photo spacers 18 are formed on the over coat layer 11 and surrounded by the liquid crystal molecules.

When a voltage is applied to the pixel and common electrodes 162 and 161, a horizontal in-plane electric field that is parallel to a surface of the TFT substrate 17 is established between the pixel and common electrodes 162 and 161. The liquid crystal molecules are twisted so as to align according to the electric field. That is, the long axes of the liquid crystal molecules are oriented perpendicular to the pixel and common electrodes 162 and 161.

According to the configuration of the IPS-LCD 100, the photo spacers 18 are directly formed on the over coat layer 11. The over coat layer 11 is mainly made of a negative photoresist, which is similar to the material used for fabricating the photo spacers 18. Therefore the adhesive strength between the over coat layer 11 and the photo spacers 18 is weak. The photo spacers 18 adhered to the over coat layer 11 are liable to peel off. In summary, the configuration is not steady, and cannot ensure that the cell gap of the LCD 100 is consistent and reliable. Accordingly, the display characteristics of the LCD 100 may be impaired.

It is desired to provide an improved IPS type LCD which overcomes the above-described deficiencies.

SUMMARY OF THE INVENTION

An object of the present invention to provide an IPS-LCD having a steady configuration, a consistent cell gap, and a good display.

In order to achieve the object set out above, an IPS-LCD in accordance with the present invention includes opposite first and second substrates in a spatial parallel relation, a liquid crystal layer having liquid crystal molecules interposed between the first and second substrates, and a plurality of photo spacers formed between the first and second substrates for supporting a space therebetween. The first substrate includes a black matrix, a color filter layer, and an over coat layer coated on the black matrix and the color filter layer. The plurality of photo spacers are engaged with the over coat layer tightly and located corresponding to the black matrix. The second substrate includes a first electrode matrix and a second electrode matrix, for generating an electric field to drive the liquid crystal molecules.

Unlike in a conventional LCD, the photo spacers according to the present invention are formed corresponding to the black matrix and engaged with the over coat layer tightly. Thus the LCD has a steady configuration, with the photo spacers resisting peeling off from the first substrate. In addition, the steady configuration ensures that all the photo spacers have the same height, so that the LCD has a consistent cell gap. This yields good display characteristics.

Other objects, advantages, and novel features of the present invention will become more apparent from the following detailed description when taken in conjunction with the accompanying drawings.

DETAILED DESCRIPTION OF THE PRESENT INVENTION

Figure 1:
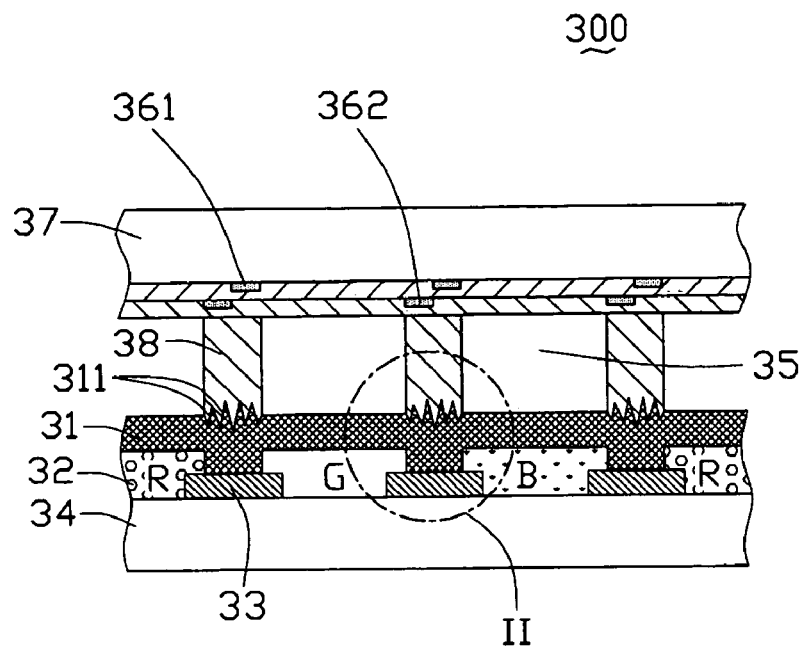
FIG. 1 is a schematic, side cross-sectional view of part of an LCD according to a first embodiment of the present invention.

FIG. 1 is a schematic, side cross-sectional view of part of an IPS-LCD 300 according to the first embodiment of the present invention. The LCD 300 includes a transparent first substrate 34, a transparent second substrate 37 opposite to the first substrate 34, a liquid crystal layer 35 including liquid crystal molecules (not labeled) sandwiched between the substrates 34 and 37, and a plurality of photo spacers 38 formed between the substrates 34 and 37 for supporting the LCD 300 and maintaining the space between the substrates 34 and 37. The substrates 34 and 37 are called a color filter substrate and a TFT (thin film transistor) substrate respectively, and are parallel to each other.

A plurality of pixel electrodes 362 and a plurality of common electrodes 361 are formed on a surface of the second substrate 37 that faces the first substrate 34. The electrodes 362 and 361 are used for generating an electric field to drive the liquid crystal molecules.

FIG. 1 also shows a structure of a color filter of the present invention, which includes the substrate 34, a black matrix 33 formed on the substrate 34, a color layer 32 also formed on the substrate 34, and an over coat layer 31 covering the black matrix 33 and the color layer 32. The color layer 32 comprises three primary color resists of red (R), green (G), and blue (B). The black matrix 33 includes a plurality of holes (not labeled) that are arranged in an array. The three primary color resists are coated in the holes in a repeating pattern.

Figure 2:
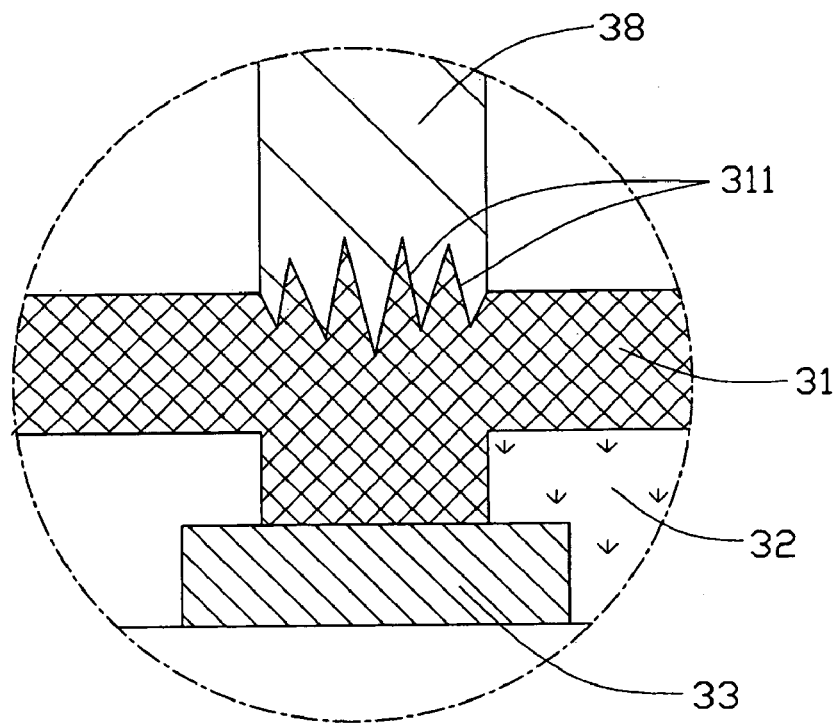
FIG. 2 is an enlarged view of a circled portion II of FIG. 1.

Also referring to FIG. 2, this is an enlarged view of a circled portion II of FIG. 1. A plurality of rough regions 311 of the over coat layer 31 is formed according to positions of the photo spacers 38 adhered on the over coat layer 31. The location of each photo spacer 38 corresponds to the black matrix 33, and the photo spacer 38 is adhered on the corresponding rough region 311 of the over coat layer 31. A plurality of protrusions is formed on the surface of each rough region 311. During the process of forming the photo spacers 38, a bottom surface (not labeled) of each photo spacer 38 fittingly interlocks between the protrusions, so that the photo spacers 38 tightly engage with the over coat layer 31. The photo spacers 38 and the over coat layer 31 can each be made from a positive or a negative photoresist.

When a voltage is applied between the pixel and common electrodes 362 and 361, a horizontal in-plane electric field that is parallel to a surface of the second substrate 37 is established between the pixel and common electrodes 362 and 361. The liquid crystal molecules are twisted so as to align according to the electric field. That is, the long axes of the liquid crystal molecules are oriented perpendicular to the pixel and common electrodes 362 and 361.

In summary, the rough regions 311 of the over coat layer 31 strengthen the adhesive bonding between the photo spacers 38 and the over coat layer 31. Accordingly, the LCD 300 has a steady, reliable configuration, and a cell gap of the LCD 300 remains consistent.

Figure 3:
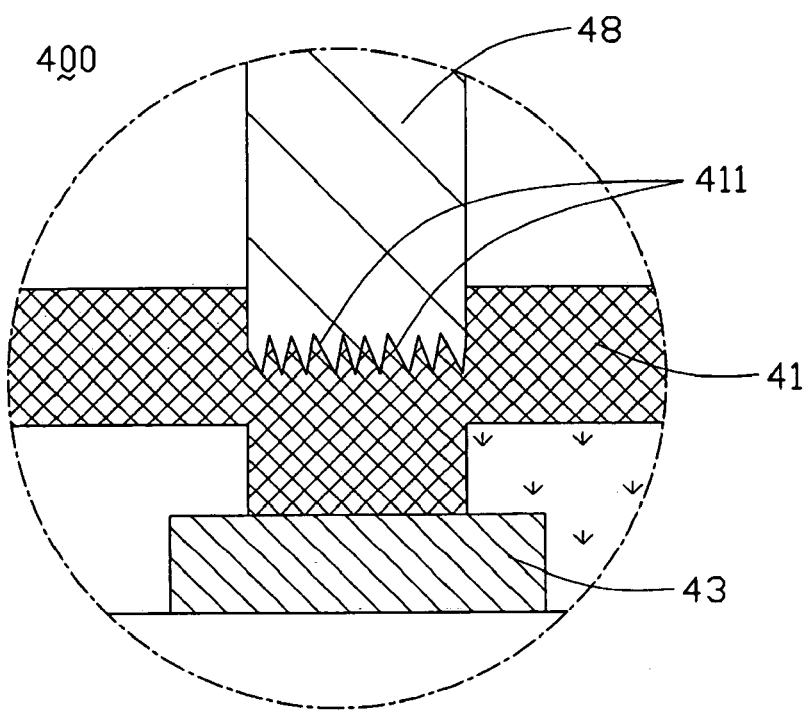
FIG. 3 is an enlarged view of part of an LCD according to a second embodiment of the present invention, showing a photo spacer extending into an over coat layer.

FIG. 3 is an enlarged view of part of an IPS-LCD 400 according to the second embodiment of the present invention. The LCD 400 has a configuration similar to the LCD 300 of the first embodiment. However, a plurality of photo spacers 48 is formed corresponding to a black matrix 43, with the photo spacers 48 extending into the over coat layer 41. That is, a bottom end (not labeled) of each photo spacer 48 is embedded in the over coat layer 41. A plurality of rough regions 411 of the over coat layer 41 is formed according to positions of the photo spacers 48 adhered on the over coat layer 41. During the process of forming the photo spacers 48, a bottom end (not labeled) of each photo spacer 48 fittingly interlocks in the over coat layer 41, so that the photo spacers 48 tightly engage with the over coat layer 41.

Figure 4:
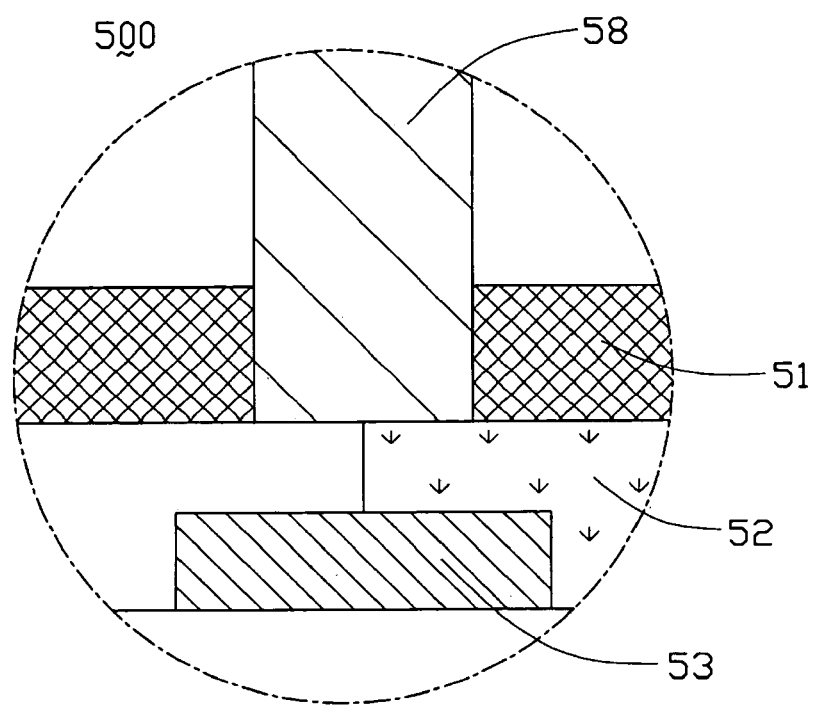
FIG. 4 is an enlarged view of part of an LCD according to a third embodiment of the present invention, showing a photo spacer abutting a color filter.

FIG. 4 is an enlarged view of part of an IPS-LCD 500 according to the third embodiment of the present invention. The LCD 500 has a configuration similar to the LCD 300 of the first embodiment. However, the three color resists of red (R), green (G), and blue (B) are formed in a continuous manner such that a color layer 52 completely covers a black matrix 53. Photo spacers 58 are formed corresponding to the black matrix 53. Each photo spacer 58 extends through an over coat layer 51 and abuts the color layer 52. A bottom end (not labeled) of each photo spacer 58 fittingly interlocks between the over coat layer 51 and the color layer 52, so that the photo spacers 58 tightly engage with the over coat layer 51 and the color layer 52.

Figure 5:
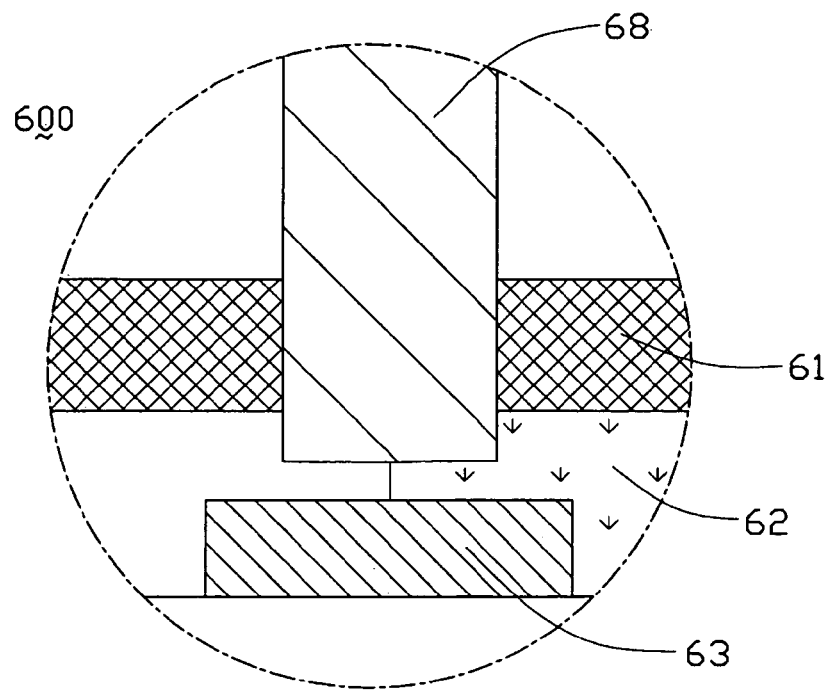
FIG. 5 is an enlarged view of part of an LCD according to a fourth embodiment of the present invention, showing a photo spacer extending into a color filter.

FIG. 5 is an enlarged view of part of an IPS-LCD 600 according to the fourth embodiment of the present invention. The LCD 600 has a configuration similar to the LCD 500 of the third embodiment. However, photo spacers 68 are formed corresponding to a black matrix 63, with each photo spacer 68 extending into a color layer 62. A bottom end (not labeled) of each photo spacer 68 fittingly interlocks between the over coat layer 61 and the color layer 62, so that the each photo spacers 68 tightly engage with the over coat layer 61 and the color layer 62.

Figure 6:
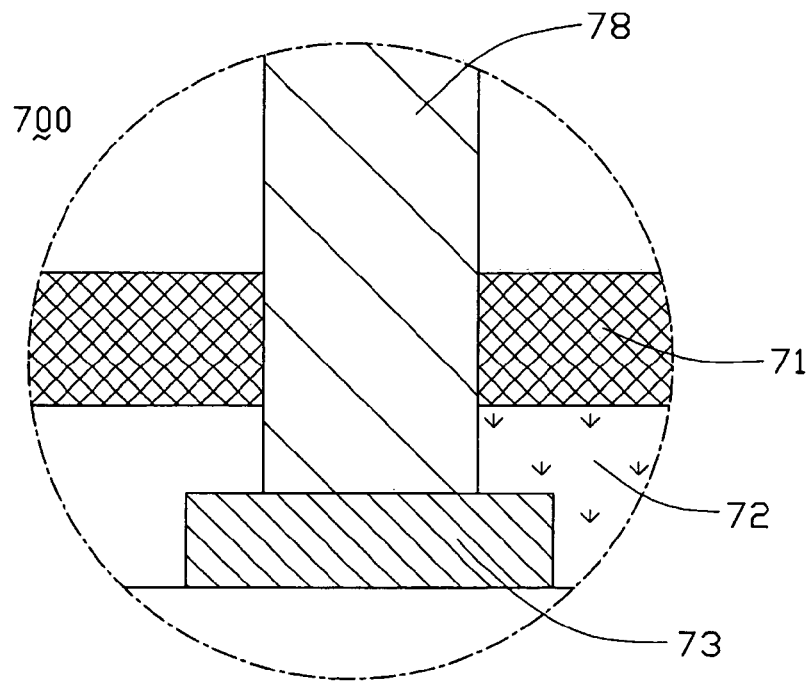
FIG. 6 is an enlarged view of part of an LCD according to a fifth embodiment of the present invention, showing a photo spacer abutting a black matrix.
Figure 7:
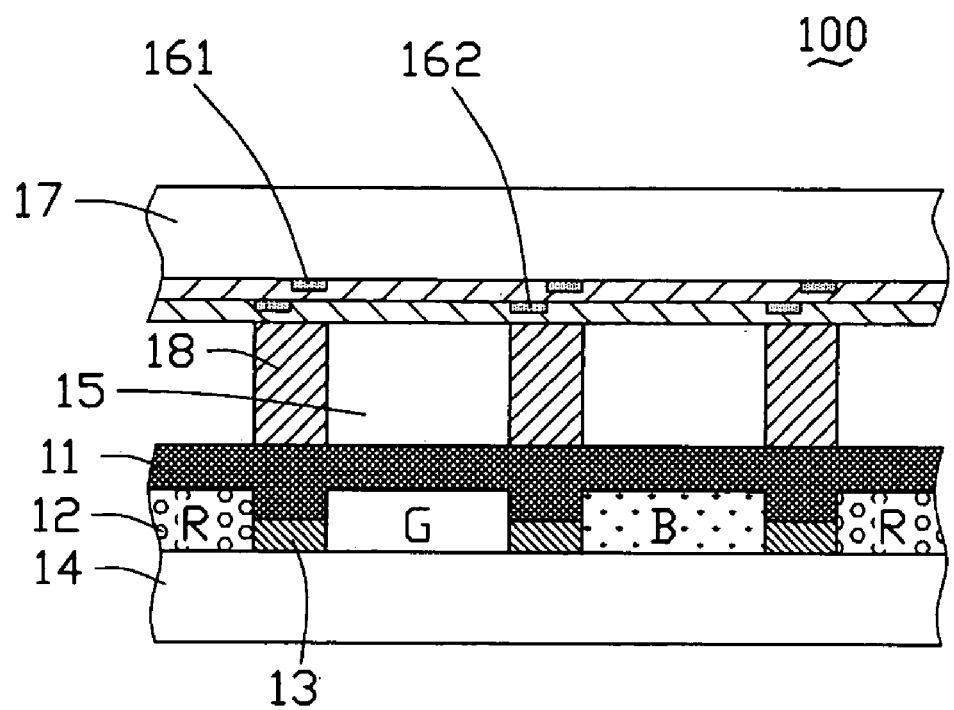
FIG. 7 is a schematic, side cross-sectional view of part of a conventional LCD.

FIG. 6 is an enlarged view of part of an IPS-LCD 700 according to the fifth embodiment of the present invention. The LCD 700 has a configuration similar to the LCD 500 of the third embodiment. However, photo spacers 78 are formed corresponding to a black matrix 73, with each photo spacer 78 extending through an over coat layer 71 and a color layer 72 and abutting the black matrix 73. A bottom end (not labeled) of each photo spacer 78 fittingly interlocks between the over coat layer 71, color layer 72 and the black matrix 73, so that the photo spacers 78 tightly engage with the over coat layer 61, the color layer 72 and the black matrix 73.

Compared with the conventional IPS-LCD 100 of the prior art, the photo spacers of the present invention are formed corresponding to the black matrix, and are tightly engaged with the over coat layer. Therefore the LCD has a steady configuration, and the photo spacers resist peeling away from the color filter substrate. In addition, the steady configuration ensures that all the photo spacers have the same height, which gives the LCD a consistent cell gap. This yields good display characteristics.

It is to be understood, however, that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A color filter, comprising:
   a substrate;
   a black matrix provided on the substrate, the black matrix defining a plurality of holes therein;
   a color layer formed on the substrate;
   an over coat layer formed over the substrate to cover the black matrix and the color layer; and
   a plurality of photo spacers located corresponding to the black matrix and engaged with the over coat layer;
   wherein the over coat layer defines a plurality of regions corresponding to the photo spacers, and the over coat layer comprises a plurality of protrusions at the regions, the photo spacers interlock with the protrusions.

2. A color filter, comprising:
   a substrate;
   a black matrix provided on the substrate the black matrix defining a plurality of holes therein;
   a color layer formed on the substrate;
   an over coat layer formed over the substrate to cover the black matrix and the color layer; and
   a plurality of photo spacers located corresponding to the black matrix and engaged with the over coat layer, each of the photo spacers extending into the over coat layer, and an end of each of the photo spacers being embedded in the over coat layer;

wherein the over coat layer defines a plurality of regions corresponding to the photo spacers, and the over coat layer comprises a plurality of protrusions at the regions, the ends of the photo spacers interlock with the protrusions.

3. An in-plane switching type liquid crystal display, comprising:

a first substrate having a black matrix and a color layer, and an over coat layer coated on the black matrix and the color layer;

a second sub strate parallel to and spaced from the first substrate, the second substrate having a first electrode matrix and a second electrode matrix for generating a driving electric field;

a liquid crystal layer comprising liquid crystal molecules interposed between the first and second substrates; and a plurality of photo spacers provided between the first and second substrates for supporting a space therebetween, the photo spacers being located corresponding to the black matrix and being engaged with the over coat layer;

wherein the over coat layer defines a plurality of regions corresponding to the photo spacers, the regions have a plurality of protrusions, and the photo spacers interlock with the protrusions.

4. An in-plane switching type liquid crystal display, comprising:

a first substrate having a black matrix and a color layer, and an over coat layer coated on the black matrix and the color layer;

a second substrate parallel to and spaced from the first substrate, the second substrate having a first electrode matrix and a second electrode matrix for generating a driving electric field;

a liquid crystal layer comprising liquid crystal molecules interposed between the first and second substrates; and a plurality of photo spacers provided between the first and second substrates for supporting a space therebetween, the photo spacers being located corresponding to the black matrix and being engaged with the over coat layer;

wherein each of the photo spacers extends into the over coat layer, the over coat layer defines a plurality of regions corresponding to the photo spacers, the regions have a plurality of protrusions, and the photo spacers interlock with the protrusions.

* * * * *